T. S. EASTON.
MODE OF PREVENTING THE EXPLOSION OF STEAM BOILERS.
No. 42. Reissued June 11, 1842.
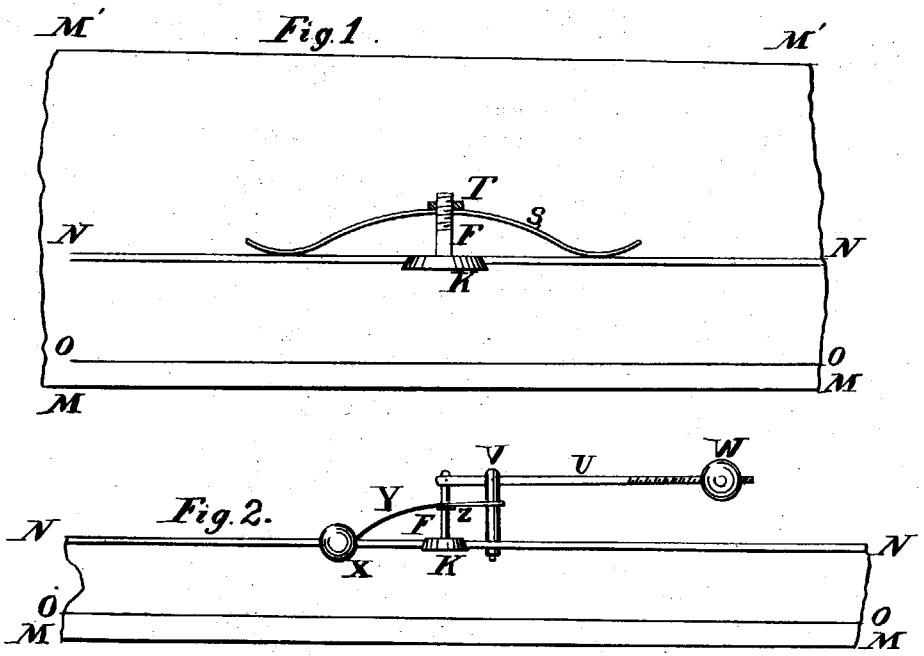
THE NORRIS PETERS CO., PHOTO-LITHO., WASHINGTON, D. C.

UNITED STATES PATENT OFFICE.

THOMAS S. EASTON, OF MOBILE, ALABAMA.

IMPROVEMENT IN THE MODE OF PREVENTING THE EXPLOSION OF STEAM-BOILERS.

Specification forming part of Letters Patent No. 2,454 dated February 12, 1842; Additional Improvement dated May 17, 1842; Reissue No. 42, dated June 11, 1842.

*To all whom it may concern:*

Be it known that I, THOMAS S. EASTON, of Mobile, Alabama, have made an Improvement in the Mode of Preventing Steam-Boilers from Bursting or their Flues from Collapsing; and I do hereby declare that the following is a full and exact description of my invention.

The object of this invention is to produce a discharge of steam and water into the flue from the boiler by the action of the pressure of steam. I employ a valve in the flue, which is to be borne up by the means of a weight or a spring. When the latter is used, it is so arranged that its tension may be governed at pleasure, so that when the pressure exceeds a certain amount the said valve will open and water and steam will be discharged into the flue. When a weight is employed, it also may be so made as to be capable of adjustment to any required degree of pressure.

In the accompanying drawings, Figure 1, N N is the top of the flue, O O its bottom, and M the bottom of the boiler, and M^c M^c the top. K is a valve, opening downward into the flue, and having its stem F, which passes through a hole in the middle of a spring, S. A nut, T, is tapped on the stem F, and by means of this nut the valve K is borne up against its seat with a force which may be made to equal any desired number of pounds, and it will be manifest that when the pressure transcends this force the valve will open and water and steam will be discharged through its seat until the pressure is taken off.

When a weight is used, I employ it in the following manner:

In Fig. 2, K is the flue-valve, opening downwardly, as before; F its stem, which at its upper end is attached by a joint-pin to a lever, U, which has its fulcrum in a standard, N, rising from the top N N of the flue. W is a weight on said lever, which may work back and forth on a screw, so as to graduate its force, and it will be manifest that the weight will operate on the valve with an effect similar to that of the spring last described, so that when the pressure becomes too great its force will open the valve.

For the purpose of opening the valve when the water is getting too low in the boiler, although the pressure alone may not suffice to produce the result, I attach two floats—one of which is shown at X—to an arm, Y, which works on a joint-pin on the standard V. When there is sufficient water in the boiler, the floats do not act on the stem F; but when the water subsides the arm Y then bears upon a shoulder or offset, Z, on the valve-stem, and their weight, which, if desired, may be a full counter-balance to the weight W, will open the valve. I use two floats, and divide the arm Y into two branches to enable the floats to pass down on each side of the flue.

What I claim is—

1. The within-described manner in which I have combined a spring or weight with the valve opening downward on the flue of a steam-boiler, so that the tension of said spring or the action of the weight may be regulated at pleasure, and so that the valve shall be opened by the pressure of the steam whenever the pressure shall equal a given amount, the respective parts being arranged substantially as herein described and made known.

2. The combining with valve-stem, when a weight is used, a float or floats which, when the water becomes too low in the boiler, shall operate as a weight upon the valve-stem, counteracting the weight upon the lever, and thereby causing the valve to open, as herein fully made known, said valve being placed upon and opening downward into the flue of a boiler, as set forth.

THOS. S. EASTON.

Witnesses:

JAMES DAVIS,

ALEXANDER CONNISON.